United States Patent

Smith

[15] 3,703,811
[45] Nov. 28, 1972

[54] OIL BOOM WITH CONTINUOUS CONDUIT THERETHROUGH

[72] Inventor: Wilbur C. Smith, North Caldwell, N.J.

[73] Assignee: Worthington Corporation, Harrison, N.J.

[22] Filed: Aug. 28, 1970

[21] Appl. No.: 67,858

[52] U.S. Cl. ................................................61/1 F
[51] Int. Cl. .......................E02b 15/04, B01d 17/02
[58] Field of Search ..........61/1 F, 1, 5; 210/DIG. 21, 210/242, 528, 23; 285/398

[56] References Cited

UNITED STATES PATENTS

| | | | |
|---|---|---|---|
| 3,494,132 | 2/1970 | Logan | 61/1 F |
| 3,608,316 | 9/1971 | Manuel | 61/1 F |
| 3,221,884 | 12/1965 | Muller | 210/242 |
| 3,476,246 | 4/1969 | Dahan | 61/1 F |
| 3,503,512 | 3/1970 | Desty et al. | 61/1 F X |
| 565,698 | 8/1896 | Sparks | 285/398 X |
| 3,532,219 | 10/1970 | Valdespino | 210/242 |

*Primary Examiner*—Jacob Shapiro
*Attorney*—Lerner, David & Littenberg

[57] ABSTRACT

An oil boom is disclosed which comprises a continuous length of tubing made of flexible material; a first weighted fin of flexing material suspended from the tubing along its length thereof; and valve means secured to the tubing at predetermined locations along the length thereof for selectively permitting the ingress and egress of fluid to and from the tubing, whereby the tubing can be inflated and deflated. Thus the oil boom may be utilized not only to contain an oil slick floating on water, but also as a conduit to store and/or transfer oil which has been removed therefrom. In the preferred embodiment, the boom is further provided with a second fin of flexible material upstanding from the tubing along its length thereof with the second fin having floatation means therein for floating the boom and for increasing the buoyancy of the oil boom should the boom be lowered into the water. One or more lengths of oil boom of the invention may be joined in end to end relationship by connection means which join the lengths of tubing with fluid communication established therebetween.

8 Claims, 6 Drawing Figures

PATENTED NOV 28 1972 3,703,811
SHEET 1 OF 2
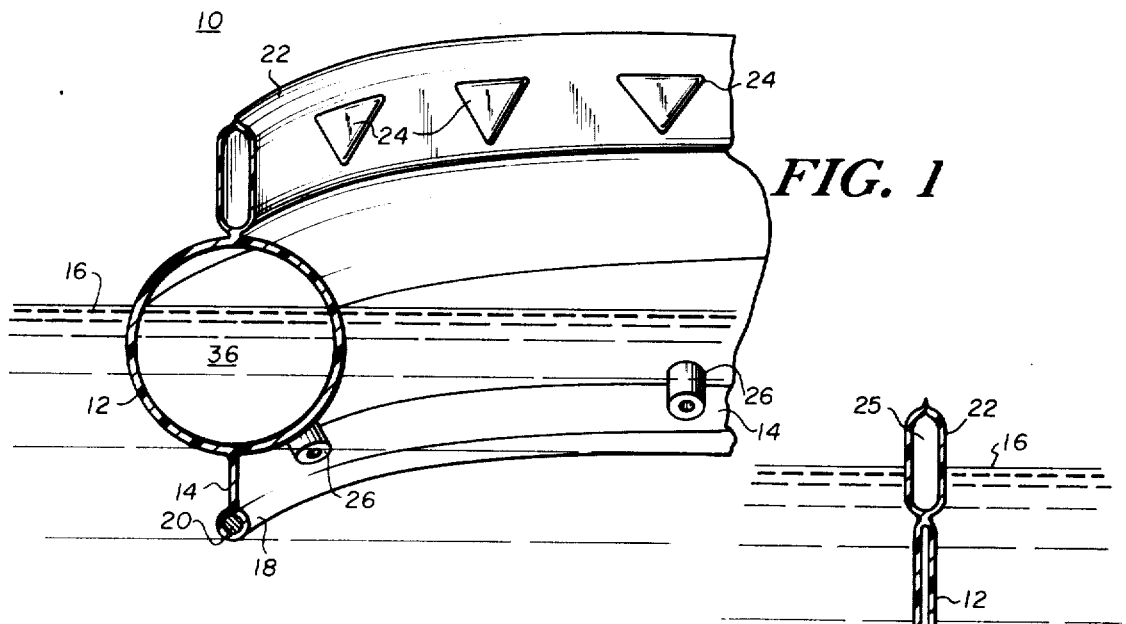
FIG. 1
FIG. 2
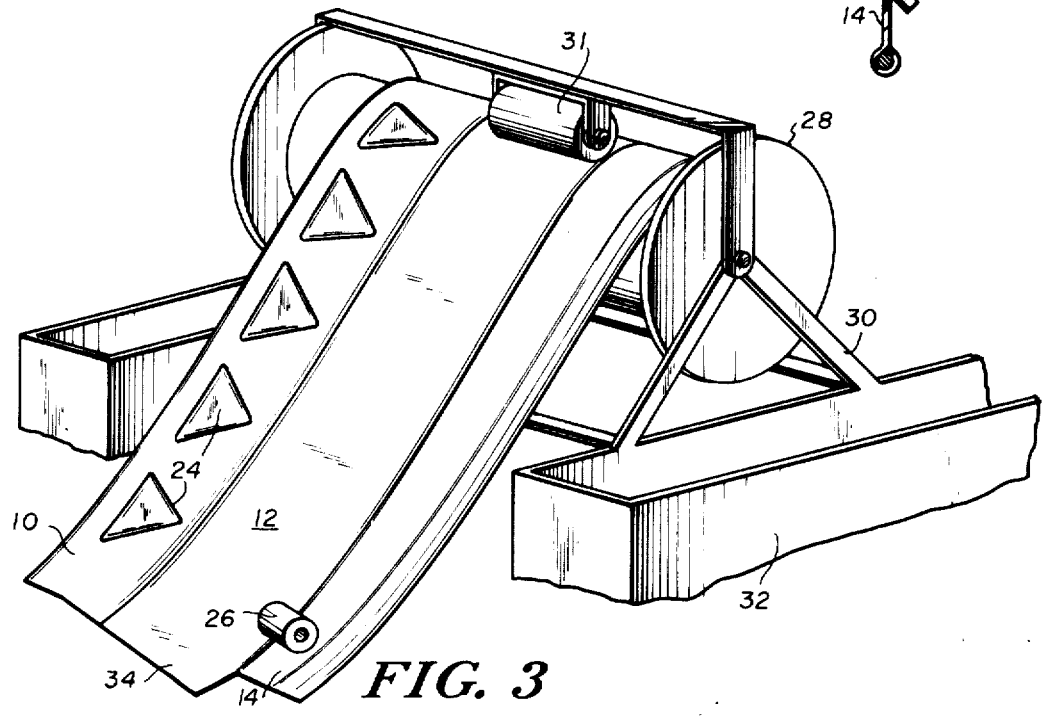
FIG. 3
LERNER, DAVID & LITTENBERG
ATTORNEYS

OIL BOOM WITH CONTINUOUS CONDUIT THERETHROUGH

BACKGROUND OF THE INVENTION

Oil slicks, created by accidental spills of oil upon navigable or recreational bodies of water cause damage to marine life by pollution and to boats, docks, beaches, etc., by deposition of unsightly and difficult to remove materials.

It is currently common practice to first attempt to contain an oil slick by surrounding it with a floating fence known in the industry as an oil boom. After the boom has contained the slick, various means may be used to disperse, burn, or collect the oil.

Early oil booms comprised nothing more than a plurality of partition like fence sections extending below and above the water line and joined in end to end relationship to form a continuous wall of impervious material for preventing the contained oil from spreading further. Later boom systems in current use are generally comprised of definite length elements of rigid or semi-rigid floatation material provided with a fin extending below and above the water level. These lengths are connected by flexible "hinges" which provide continuity of wall surface and at the same time permit an overall boom system as long as desired to be folded, accordian style, in storage on the deck of a work boat or in other convenient places. To further facilitate storage, it has even been suggested to construct individual sections of a boom system with flexible inflatable floatation chambers which can be inflated for instance by $CO_2$ cartridges when it is desired to float the boom section. A number of these inflated boom sections can be joined to produce a boom of desired length. Such a system is illustrated for example in the Simpson et al. U.S. Pat. No. 2,682,151. Other prior art oil boom patents include Hook U.S. Pat. No. 2,200,552; Wicklander U.S. Pat. No. 2,968,928; Smith U.S. Pat. No. 3,146,598; Galvaing U.S. Pat. No. 3,184,923; Muller U.S. Pat. No. 3,221,884; Hinde U.S. Pat. No. 3,293,861; Smith et al. U.S. Pat. No. 3,321,923; and Dahan U.S. Pat. No. 3,369,664.

Regardless of their particular construction, the known flexible, boom systems function only to physically contain the oil slick in a definite location. Prior to the instant invention, there existed no continuous, flexible, easy to handle, and easy to store boom section having expanded capabilities such as for the storage and/or transfer of the oil recovered from the oil slick.

SUMMARY OF THE INVENTION

As suggested above, the instant invention relates to an oil boom made of continuous, flexible material that can be compactly stored and easily handled (for instance by being coiled on a reel and payed out as needed) to surround an oil slick or to protect an area desired to be free of floating contaminants. In addition, however, the boom of the instant invention has further capabilities in that it includes a continuous, inflatable, hollow tube which constitutes a storage space for recovered oil and/or a transferring conduit therefor.

In the preferred embodiment, valve means are preselectively located along the length of the tubing to selectively facilitate the ingress and egress of fluid such as oil to and from the tubing of the oil boom. Thus and as an example of its many uses, once the oil boom is in place, for instance across a harbor mouth, oil can be pumped from the oil recovery unit (located for example on a work boat) into one of the valves accessible to the craft and through the tubing of the oil boom to appropriate storage receptacles located on shore.

Like the prior art devices, the oil boom of the instant invention includes a weighted fin which functions much like the keel of a boat to maintain the oil boom in a proper upright position. Unlike the prior art, however, in a preferred embodiment the oil boom of the instant invention includes a second fin of flexible material upstanding from the inflatable tubing of the boom with the second fin having floatation means therein for floating the boom and for increasing the buoyancy of the oil boom should the boom be lowered into the water. Thus, and regardless of the contents of the inflatable tube, the boom will remain at a relatively constant vertical position in the water.

In preferred embodiments of the invention the floatation means of the second fin may comprise a plurality of individual floatation pockets provided therein or alternatively might comprise a continuous conduit running therethrough.

As a particular advantageous feature of the invention, one or more oil boom lengths of the instant invention may be joined together in end to end relationship by connection means which join the boom sections in such a way that their respective inflatable tube portions are joined with fluid communication established therebetween. In this manner, and regardless of how many boom lengths are secured to one another in end to end relationship, there still remains a continuous conduit running through the entire length of the boom system to facilitate oil storage and/or transfer.

Accordingly, it is an object of the instant invention to provide an oil boom comprising a continuous length of tubing made of flexible material; a first weighted fin of flexible material suspended from said tubing along the length thereof; and entry means cooperating with said tubing for selectively permitting the ingress and egress of fluid to and from the tubing.

Another object of the instant invention is to provide such an oil boom which is capable of storing and/or transporting fluids therethrough.

Yet another object of the instant invention is to provide such an oil boom which includes a second fin upstanding from the inflatable tubing thereof, with said second fin including floatation means therein for floating the boom and for adding buoyancy to the oil boom should it be lowered in the water.

Another object of the instant invention is to provide such an oil boom which is comprised of a plurality of sectional lengths joined together in such a manner that the inflatable tubing portions of each are joined to one another in a continuous fluid communicating relationship.

These and other objects of the instant invention as well as a better understanding thereof may be had by referring to the following description and drawings in which:

FIG. 1 is a perspective view, partly in section, of a section of oil boom constructed in accordance with the teachings of the instant invention;

FIG. 2 is a front sectional view of an alternative embodiment of the oil boom;

FIG. 3 is a perspective view of an oil boom constructed in accordance with the instant invention as it is being dispensed or retrieved from a cooperating reel associated therewith;

Figure 4:
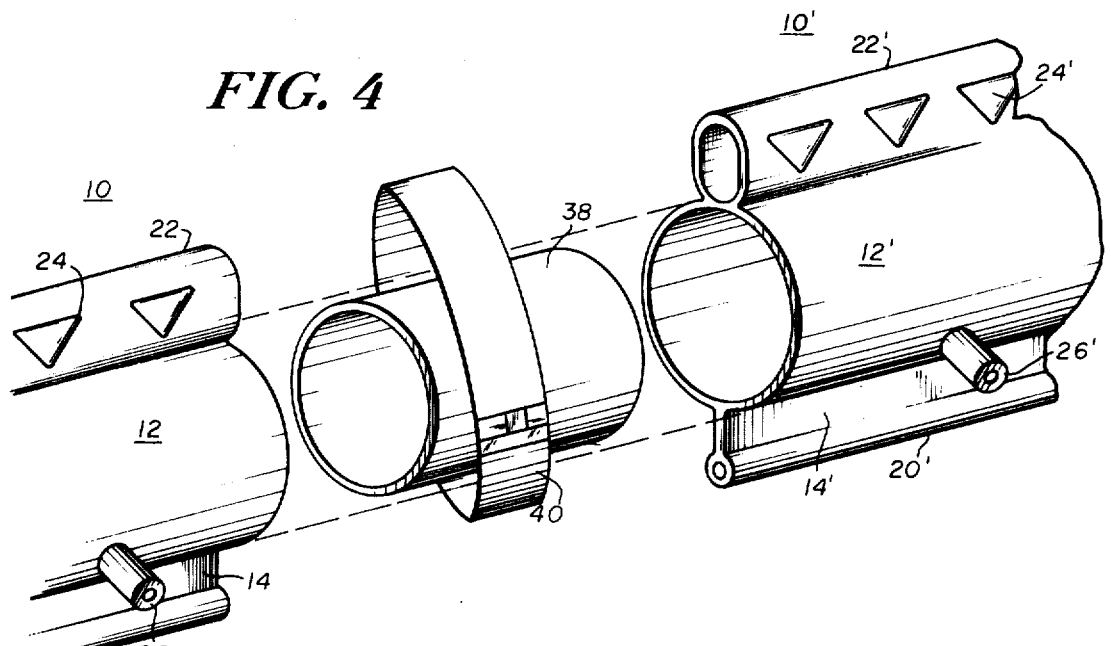
Figure 5:
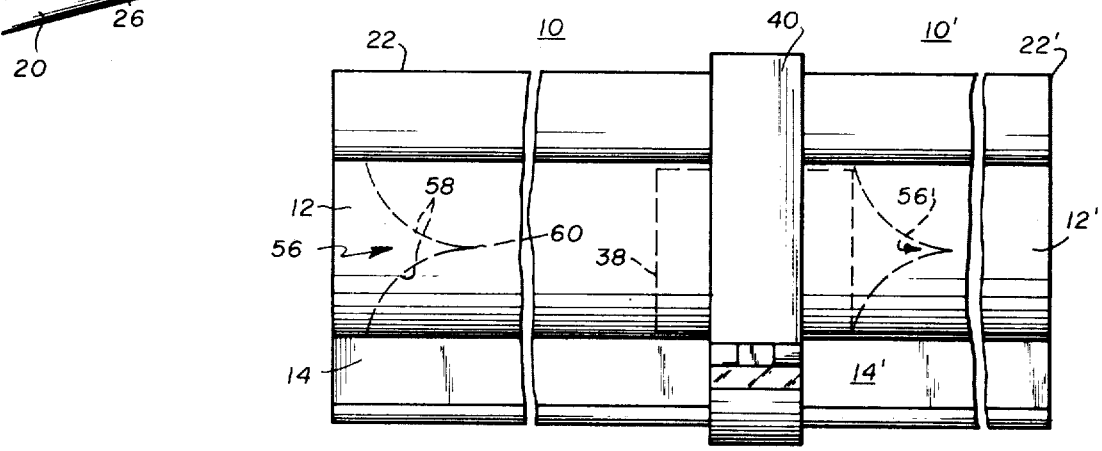
Figure 6:
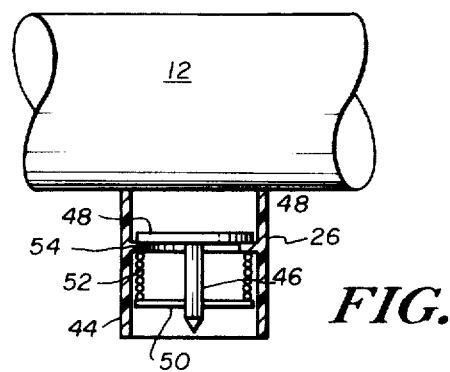

FIG. 4 is a perspective view of two sections of oil boom constructed in accordance with the instant invention and further illustrating the manner in which they might be joined in end to end relationship; and FIG. 5 is a side view of two sections of oil boom constructed in accordance with the instant invention joined in end to end relationship and further illustrating the utilization of one way check valves therein; and FIG. 6 is an enlarged view, partly in section, of a valve which can be used in conjunction with the oil boom of the instant invention.

Turning to the Figures, wherein like numerals are used to designate like elements, there is illustrated in FIG. 1, a length of oil boom 10 constructed in accordance with the instant invention. It will be understood, that the oil boom 10 is a continuous length of flexible plastic or rubber-like material that can be compactly stored and easily handled (for instance by being coiled on a reel and payed out as needed) to surround an oil slick or protect an area desired to be free of floating contaminants. The section of oil boom 10 may be constructed of any convenient length (the length for a given segment being dependent primarily upon such factors as storage space available for example on a particular reel upon which it is to be wound), and one such length of oil boom 10 may be more than sufficient for a particular oil slick which the boom must contain. If, however, one such length of oil boom is insufficient for a particular application, then a plurality of such oil boom lengths may be joined together in end to end relationship as shown in FIG. 4 and as will be described in detail in connection therewith.

Before going into detail as to the particular construction, it may be pointed out at the present time, that the oil boom 10 is made of any tough, easy to shape, abrasion resistant, flexible plastic or synthetic rubber material. Preferred materials are extruded or shaped polyurethane or polyurethane coated fabric both of which exhibit all of the desired characteristics and in addition, remain flexible over a wide temperature range and can be easily heat sealed to establish the various shapes to be discussed below. Other materials are of course possible so long as they exhibit the desired characteristics.

Turning in detail to the construction of the boom, the boom section 10 is seen to comprise a continuous length of tubing or conduit 12 which as contrasted in FIG. 1 and 2, may be inflated or deflated by means to be discussed in greater detail. Depending from the tubing 12 is a first fin or skirt 14 which functions much like the keel of a boat in maintaining the boom 10 in a proper vertical position when the boom is in the water generally designated at 16. Embedded in the lower border area 18 of the depending fin 14 is a ballast, preferably in the form of a continuous flexible metal cable 20, which aids in maintaining the boom 10 in its proper upright position in the water. Finally, the boom includes a second fin or skirt 22 upstanding from the tubing 12 along its length thereof. The second skirt 22 further includes floatation means therein the function of which will be further described. In the embodiment of the invention illustrated in FIG. 1, this floatation means comprises a plurality of individual floatation pockets 24 provided in the fin 22 during the manufacture of the boom. In the embodiment of FIG. 2, the floatation means comprises a continuous inflatable conduit 25 extending for the length of the fin 22.

As noted previously, prior art booms of the type which can be easily handled (for example by means of despensing reels illustrated in FIG. 3) have been utilized only to contain an oil slick and prevent its spread. Even prior art systems which have suggested sectionalized boom sections which can be inflated when needed (for instance of the type illustrated in the Simpson et al. U.S. Pat. No. 2,682,151) have failed to appreciate that an appropriately designed oil boom system can do much more than simply contain an oil spill. Thus, and as pointed out above, the instant inventor has invented an oil boom which functions not only to contain the oil spill, but also to store and/or transport the oil recovered from the slick.

To that end, it must first be appreciated that tubing 12 is continuous throughout the length of the section 10. Thus in the first instance, it will be appreciated that should one end of the section 10 be connected by appropriate means to the output of a unit pumping oil recovered from a slick (for example by being slid over the output pipe thereof), and the other end connected to an appropriate storage facility on shore; the very same boom section 10 being used to contain the oil slick, could simultaneously function as a conduit carrying recovered oil from the recovery apparatus to storage facilities on shore. Moreover, and as will be described in detail with respect to FIG. 4, even when two sections of the boom such as 10 and 10' in FIG. 4 are connected in end to end relationship, the connecting means are such that the respective tubes 12 and 12' thereof will be in fluid communication with one another whereby for all practical purposes, a continuous conduit is established throughout the entire boom system. Thus in its broadest sense it will be appreciated that the ends of the tubing 12 constitute entry means cooperating with the tube itself for permitting ingress and egress of fluids to the tube; and if so desired the invention can be practiced with no further access points being provided to the tube 12.

To more selectively facilitate the ingress and egress of fluids to and from the tube 12, a plurality of valves 26 are spaced at predetermined locations along the length of the tube 12. Any suitable valve structure may be employed, and FIG. 5, to be discussed in greater detail illustrates one particular valve 26 which may function to permit selective entry to and exit of fluids from the tubing 12.

FIG. 3 illustrates a reel 28 which can be utilized to store, pay-out, and reel up an oil boom 10 of the instant invention. In FIG. 3, the reel 28 is shown as secured by appropriate struts 30 to the rear of a catamaran type vessel 32 (not shown in detail) which normally would contain the oil recovery unit being employed to clean up the oil spill. In one possible application of the instant invention, the main oil recovery craft 32 with the boom containing reel 28 thereon would approach the oil slick which had occurred on the body of water in question. Then a worker in a small vessel such as a small outboard motor boat would take the free end of the boom such as indicated at 34, and tow the boom around the perimeter of the oil slick.

Once the oil slick was surrounded, and the smaller boat reapproached the main oil recovery craft, the end 34 of the tubing 12 can be connected to the output pipe of the oil recovery means (not shown) such as by being telescopically received thereon, and the oil being recovered from the slick will thereby be pumped into the tube 12 which thereby will function as a storage vehicle therefor as it becomes inflated by the oil.

To illustrate other possible uses of the instant invention, it should be pointed out for some oil cleanups, it is not practical or desirable to attempt to completely surround the spill. Such a situation might be the prevention of migration of the slick through the mouth of a harbor. For these situations, the oil boom of the instant invention is payed out from a storage reel (either on board a craft or located on shore) in more or less a straight line rather than an enclosed loop and would eventually extend from shore to shore across the mouth of the body of water which is to be protected. Once the boom is in place, the oil recovery craft could approach any one of the conveniently accessible valves 26 and directly pump recovered oil through the tubing 12 to land based storage receptacles or trucks located at either end or both ends of the boom.

The above illustrations suggest only a few of the numerous ways in which the boom of the instant invention can be employed. Broadly speaking, the important structural feature of the instant invention which makes all of these uses and many more possible is the fact that there is a continuous length of tubing provided throughout the length of the oil boom whereby oil and/or other fluids can be easily stored and/or transported therethrough.

It should be pointed out that in the practice of the invention with the embodiment of FIG. 1, the total buoyancy established by the floatation pockets 24 is sufficient to float the boom even with a deflated main conduit 12. Of course, if oil is stored therein or transferred therethrough, added buoyancy is provided since oil is more buoyant than the water it displaces. If the embodiment of FIG. 2 is being employed, then it will of course be necessary to inflate the conduit 25 (either while the boom is being payed out or thereafter) in order to float the boom. Furthermore the volume of the conduit 25 (when inflated) is large enough to float the boom even when the conduit 12 is deflated.

FIG. 3 further illustrates the utilization of a pressure roller 31 in conjunction with the reel 28. Thus when reeling in the boom 10, the pressure roller 31 squeezes the tubing 12, thereby deflating it and forcing out any air or fluid which remains in the boom. Furthermore, if the embodiment of FIG. 2 is being employed, an additional pressure roller (not shown) is employed to deflate the fin 22 while the boom is being reeled in.

Also, and as suggested above, it should be noted that the reel 28 need not be employed on a craft such as 32 but could be land based at a particular harbor or waterway location where oil spill is likely or truck based for maximum transportability.

Returning to FIG. 1, the oil boom 10 of the instant invention is shown storing or transporting recovered oil 36 therethrough. Of course, it will be appreciated that when the tubing 12 is filled with oil, then the boom 10 is more buoyant than when the tube 12 is deflated. Thus and assuming that the bulk of the recovered oil has been transferred through the boom to an appropriate storage facility, then as the tubing 12 begins to deflate, there is a natural tendency for the entire boom 10 to sink somewhat into the water 16 (although it will never sink entirely since both the pockets 24 of FIG. 1 or the conduit 25 of FIG. 2 are sufficient to float a boom with conduit 12 deflated). However if the boom 10 sinks too low into the water, then the upstanding fin 22 will fail to prevent the oil slick from being splashed over the top thereof and spreading beyond the contaminant area supposedly defined by the boom.

Accordingly, the floatation means defined in the upper fin 22 perform another function. Specifically, it will be appreciated that as the oil filled tubing 12 is being depleted of oil, and as aforedescribed, the boom 10 begins to sink, the floatation means (either the pockets 24 or the conduit 25 of FIG. 2) will enter the water 16 and in turn begin to displace more water. This displacement of water will in turn cause the entire boom to rise. Thus the inclusion of the floatation means additionally creates a self-leveling feature which keeps reasonably constant the position of the boom in the water regardless of the amount of fluid being transported or stored by the tubing 12.

When employing the embodiment of FIG. 1, the air pockets are preferably formed in the shape of inverted triangles. Thus as the boom sinks into the water (for any reason such as the deflation of the conduit 12 as aforedescribed or because of rough water) there is a progressively larger increase in buoyancy as the sinking increases. This orientation provides the most optimum self-leveling capabilities.

Turning to FIG. 4, there is illustrated one technique of joining two sections 10 and 10' of the boom of the instant invention in end to end relationship. In this embodiment, the connection means includes a relatively rigid tube 38 of such diameter that it may be tightly telescopically received within the ends of the tubes 12 and 12' of the adjacent boom section 10 and 10'. Thus when it is desirable to join two sections together, the respective tubes 12 and 12' are simply slid onto and over the ends of the tube 38 which thereby functions to maintain the continuous fluid communication between the tubes of these two sections. Thus regardless of the number of sections employed, the overall oil boom still includes a continuous hollow conduit therethrough which may be utilized to store and/or transport fluids such as the oil being recovered. Also, it will be appreciated that when employing the embodiment of FIG. 2 an additional rigid tube (not shown) will be required to interconnect the conduits 25 and 25' in continuous relationship. Finally, a clamping ring 40 may be employed to maintain the integrity of the telescoping connection between the tubes 12 and 12' on the rigid tube 38. Preferably the clamp 40 is wide enough to overlap the upper and lower fins 22, 22' and 14, 14' respectively such that a contiguous surface is presented to the oil slick.

FIG. 5 shows two sections of boom 10 connected together in the manner described with respect to FIG. 4. Additionally FIG. 5 illustrates yet another embodiment of the invention in which each section 10 is provided with a one way check valve 56 (and 56') which permits the flow of fluid to the right as viewed in FIG. 5 but not in the opposite direction. In the form illustrated the check valves 56 are in the form of deformable plastic members 58 naturally biased to close a slit 60 defined at the juncture thereof. Of course, when fluid under pressure is applied against the members 58, they open and permit flow. Other types of one way valves may be employed if desired. The advantage in using such valves is that if one conduit section 12 was punctured, the entire boom system of conduit sections 12 would not deflate. Similar valves may be employed if desired in the conduits 25 (FIG. 2 of the system) for greater integrity of the system. The primary disadvantage in using check valves in the conduits 12 is that oil may be transferred in only one direction; but even in that situation, the conduits 12 are still in continuous communication with one another.

Turning to FIG. 6, there is illustrated a simple valve 26 of the type which might be employed in the instant invention. The valve 26 of FIG. 6 is somewhat similar to a valve stem employed with conventional tire inner-tubes, but it will be appreciated that other valves for instance of the type described in FIG. 6 may be employed. The valve 26 includes a cylindrical section 44 secured by appropriate means to the tubing 12 of the oil boom. Positioned within the section 44 is a valve stem 46 having a valve closure member 48 at one end thereof and a spring retention element 50 at a second end thereof. A compression spring 52 is disposed between the spring retention element 50 and a shelf 54 integrally disposed on the interior surface of the section 44. When the valve stem 46 is depressed, the valve closure means 48 is lifted from its seat 54 to permit the ingress or egress of fluid to the tube 12. When the stem 46 is free, the compression spring 52 returns the valve stem and the valve closure means 48 to its sealing position.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

I claim

1. An oil boom comprising:
 a first continuous length of inflatable tubing made of flexible material;
 a first weighted fin of flexible material suspended from said tubing along the length thereof;
 entry means cooperating with said tubing for selectively permitting the ingress and egress of fluid to and from said tubing;
 further including a second fin of flexible material upstanding from said tubing along the length thereof;
 said second fin having floatation means therein, said floatation means having at least a predetermined volume to float said boom even with said first continuous length of tubing deflated and wherein said entry means comprises a plurality of valves at predetermined locations along said tubing.

2. The oil boom of claim 1 wherein said floatation means comprises a plurality of individual air pockets formed in said second fin.

3. The oil boom of claim 2 wherein said air pockets are formed in the shape of inverted triangles.

4. The oil boom of claim 1 wherein said floatation means comprises a continuous inflatable conduit provided through said second fin.

5. The oil boom of claim 1 and further including;
 a second continuous length of tubing of flexible material, said second length of tubing having a first weighted fin of flexible material suspended therefrom along the length thereof and entry means cooperating with said second length of tubing for selectively permitting the ingress and egress of fluid to and from said second length of tubing; and
 connection means secured to adjacent ends of said first and second lengths of tubing for joining said lengths of tubing with fluid communication therebetween.

6. The oil boom of claim 5 wherein said connection means includes a relatively rigid tube over the opposite ends of which said adjacent ends of said first and second lengths of tubing are telescopingly secured.

7. The oil boom of claim 6 wherein said connection means further includes clamping means for aiding in maintaining said adjacent ends of said first and second lengths in telescoping relationship with said tube.

8. The oil boom of claim 5 wherein each of said lengths of tubing includes a one way valve positioned therein.

* * * * *